United States Patent
Chang et al.

(10) Patent No.: US 8,441,715 B2
(45) Date of Patent: May 14, 2013

(54) ELECTRONIC PAPER UNIT AND METHOD FOR FABRICATING ELECTRONIC PAPER UNIT

(75) Inventors: Chan-Wei Chang, Kaohsiung (TW); Ho-Chien Wu, Taipei County (TW); Chia-Tien Peng, Hsinchu County (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 29 days.

(21) Appl. No.: 13/310,814

(22) Filed: Dec. 5, 2011

(65) Prior Publication Data

US 2012/0154897 A1 Jun. 21, 2012

(30) Foreign Application Priority Data

Dec. 17, 2010 (TW) .............................. 99144527 A
Sep. 6, 2011 (TW) ............................. 100132136 A

(51) Int. Cl.
*G02B 26/00* (2006.01)
*B60R 1/06* (2006.01)
*H01J 9/26* (2006.01)

(52) U.S. Cl.
USPC .............. 359/296; 359/507; 445/25

(58) Field of Classification Search ........... 359/244, 359/296, 507, 513; 445/24, 25; 345/107
See application file for complete search history.

(56) References Cited

U.S. PATENT DOCUMENTS 8,363,304 B2 * 1/2013 Tanaka .......................... 359/296
2008/0142801 A1 * 6/2008 Hsu et al. ....................... 257/59

FOREIGN PATENT DOCUMENTS

| CN | 101445319 | 6/2009 |
|----|-----------|--------|
| TW | 590993 | 6/2004 |
| TW | 200808480 | 2/2008 |
| TW | 200831227 | 8/2008 |
| TW | 200931150 | 7/2009 |
| TW | I328488 | 8/2010 |

OTHER PUBLICATIONS

Chan et al., "Optical Design of Laser Cutting/Drilling on FPD Component", Journal of the Mechatronic Industry, Jun. 2009, 71-73, vol. 315.

* cited by examiner

*Primary Examiner* — Tuyen Tra
(74) *Attorney, Agent, or Firm* — Jianq Chyun IP Office

(57) ABSTRACT

An electronic paper unit including a flexible substrate, a thin film transistor layer, an electronic ink layer, a waterproof layer, and a sealant is provided. The thin film transistor layer is disposed on the flexible substrate. The electronic ink layer is disposed on a surface of the thin film transistor layer. The waterproof layer is disposed on the electronic ink layer. An edge surface of the waterproof layer and an edge surface of the electronic ink layer form a side wall where there is a first acute angle or a first obtuse angle between the side wall and the surface of the thin film transistor layer. The sealant is coated and covered on the side wall and the surface. A method for fabricating the electronic paper unit is also provided.

16 Claims, 6 Drawing Sheets

ELECTRONIC PAPER UNIT AND METHOD FOR FABRICATING ELECTRONIC PAPER UNIT

CROSS-REFERENCE TO RELATED APPLICATION

This application claims the priority benefits of Taiwan application serial no. 99144527, filed on Dec. 17, 2010, and Taiwan application serial no. 100132136, filed on Sep. 6, 2011. The entirety of each of the above-mentioned patent applications is hereby incorporated by reference herein and made a part of specification.

BACKGROUND OF THE INVENTION

1. Field of the Invention

The invention relates to an electronic paper unit and a method for fabricating the electronic paper unit.

2. Description of Related Art

With great advancement of electronic paper (E-paper) and electronic books (E-book), a display device with features of being light, thin and flexible has become a major trend in development.

However, flexible substrates are unable to be used in current glass substrate fabrications completely because of the limitation of the materials. Thus, how to develop current equipment so flexible substrates are suitable to be fabricated has become a major topic.

SUMMARY OF THE INVENTION

The invention provides an electronic paper unit, and the electronic paper unit has favorable durability.

The invention provides a method for fabricating electronic paper units. The method has favorable productivity to fabricate electronic paper units.

An embodiment of the invention provides an electronic paper unit, comprising a flexible substrate, a thin film transistor layer, an electronic ink layer, a waterproof layer, and a sealant. The thin film transistor layer is disposed on the flexible substrate. The electronic ink layer is disposed on a surface of the thin film transistor layer. The waterproof layer is disposed on the electronic ink layer. An edge surface of the waterproof layer and an edge surface of the electronic ink layer form a side wall, and there is a first acute angle or a first obtuse angle between the side wall and the surface of the thin film transistor layer. The sealant is coated and covered on the side wall and the surface.

An embodiment of the invention provides a method of fabricating electronic paper units comprising that providing a rigid substrate, and sequentially disposing a flexible substrate, a thin film transistor layer, an electronic ink layer, and a waterproof layer on the rigid substrate to form an electronic paper array. Next, cuts the electronic paper array into a plurality of electronic paper units. Next, sealant is coated around each of the electronic paper units. Finally, removes the electronic paper units from the rigid substrate.

Based on the above, in the embodiments of the invention, the electronic paper unit is cut to form the side wall having an acute angle or an obtuse angle with the surface by a cutting apparatus, and when coating sealant, air bubbles are effectively reduced and the electronic layer will be prevented from moisture.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
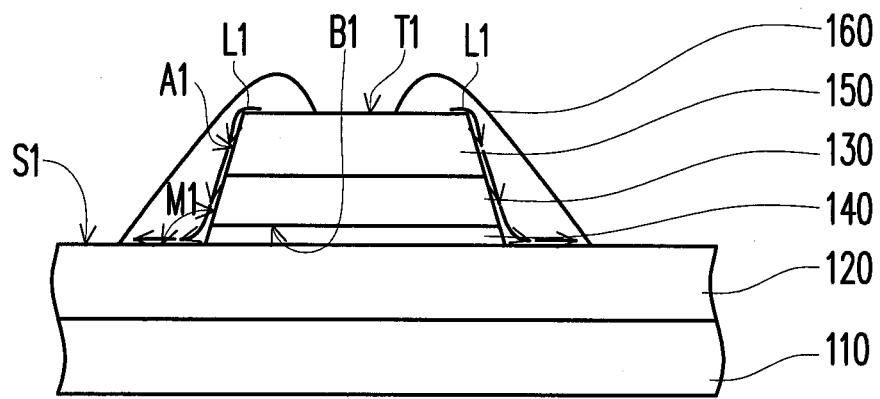
FIG. 1 is a schematic view of an electronic paper unit according to an embodiment of the invention.

FIG. 1 is a schematic view of an electronic paper unit according to an embodiment of the invention. Referring to FIG. 1, in the embodiment, the electronic paper unit 100 can comprise a flexible substrate 110, a thin film transistor layer 120, an electronic ink layer 130, an adhesive layer 140, a waterproof layer 150, and a sealant 160. The flexible substrate 110 can be a polyimide material membrane substrate. The thin film transistor layer 120 is disposed on the flexible substrate 110. The electronic ink layer 130 is disposed on a surface S1 of the thin film transistor layer 120, wherein the electronic ink layer 130 and the thin film transistor layer 120 are connected to each other through the adhesive layer 140. The electronic ink layer 130 can be an electro phoretic (EP) display membrane, and the adhesive layer 140 can be an optical clear adhesive (OCA). The adhesive layer 140 is disposed between the thin film transistor layer 120 and the electronic ink layer 130. The waterproof layer 150 is disposed on the electronic ink layer 130, and an edge surface of the waterproof layer 150 and an edge surface of the electronic ink layer 130 form a side wall A1. There is a first obtuse angle M1 between the side wall A1 and the surface S1, so the waterproof layer 150 and the electronic ink layer 130 respectively are a structure with trapezoid section being top narrow and bottom wide. The first obtuse angle M1 is substantially greater than 90 degrees and less than 100 degrees. The waterproof layer 150 can be a waterproof membrane with polyethylene terephthalate (PET) material. Moreover, the waterproof layer 150 can be pasted, coated, or other suitable way for being disposed on the electronic ink layer 130. The sealant 160 is coated and covered on the side wall A1 and the surface S1.

In the embodiment, an orthogonal projection area of a top T1 of the waterproof layer 150 on the surface S1, is less than an orthogonal projection area of a base B1 of the electronic ink layer 130 on the surface S1. That is to say, the waterproof layer 150 and the electronic ink layer 130 relative to the flexible substrate 110 and the thin film transistor layer 120 form a structure with trapezoid section being top narrow and bottom wide, wherein the first obtuse angle M1 is greater than 90 degrees and less than 100 degrees.

Accordingly, when coating the sealant 160, since the waterproof layer 150 and the electronic ink layer 130 both are structures with trapezoid sections being top narrow and bottom wide, the sealant 160 on the top T1 flows along the side wall A1 to the surface S1 of the thin film transistor layer 120. In the limited area of the flexible substrate 110, this allows the electronic paper unit 100 to become a structure where the sealant will cross the top of waterproof layer 150 to the surface of the thin film transistor layer 120, which is favorable to banish the air bubbles during the sealant 160 flowing to the corners corresponding to the first obtuse angle M1 (shown in FIG. 1, air bubble pass path as L1), so as to increase air blocking ability of the sealant 160.

Figure 2:
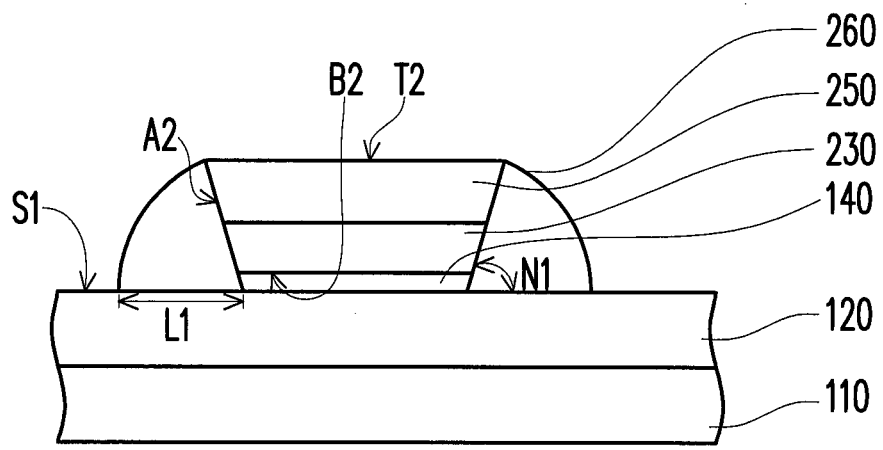
FIG. 2 is a schematic view of an electronic paper unit according to another embodiment of the invention.

FIG. 2 is a schematic view of an electronic paper unit according to another embodiment of the invention. Referring to FIG. 2, in the embodiment, the difference to the above embodiment is an orthogonal projection area of a top T2 of a waterproof layer 250 on the surface S1, is greater than an orthogonal projection area of a base B2 of an electronic ink layer 230 on the surface S1. An edge surface of the waterproof layer 250 and an edge surface of the electronic ink layer 230 form a side wall A2, and there is a first acute angle N1 between the side wall A2 and the surface S1. The first acute angle N1 is substantially greater than 80 degrees and less than 90 degrees, so the waterproof layer 250 and the electronic ink layer 230 of an electronic paper unit 200 form a structure with trapezoid section being top wide and bottom narrow. A sealant 260 will fill the concave formed between the side wall A2 and the surface S1, to form a structure where the sealant 260 permeates the concave formed between the side wall A2 and the surface S1. Thereby, after coating the sealant 260, the distance L1 covered on the surface S1 is longer. In other words, it is difficult for external moisture to invade the electronic ink layer 230 and make the electronic paper unit 200 unworkable. When coating the sealant 260 in the limited area of the flexible substrate 110 in the present embodiment, the distance L1 of the sealant 260 to block moisture can be effectively increased, so that electronic paper unit 200 has favorable ability about moisture blocking.

Figure 3:
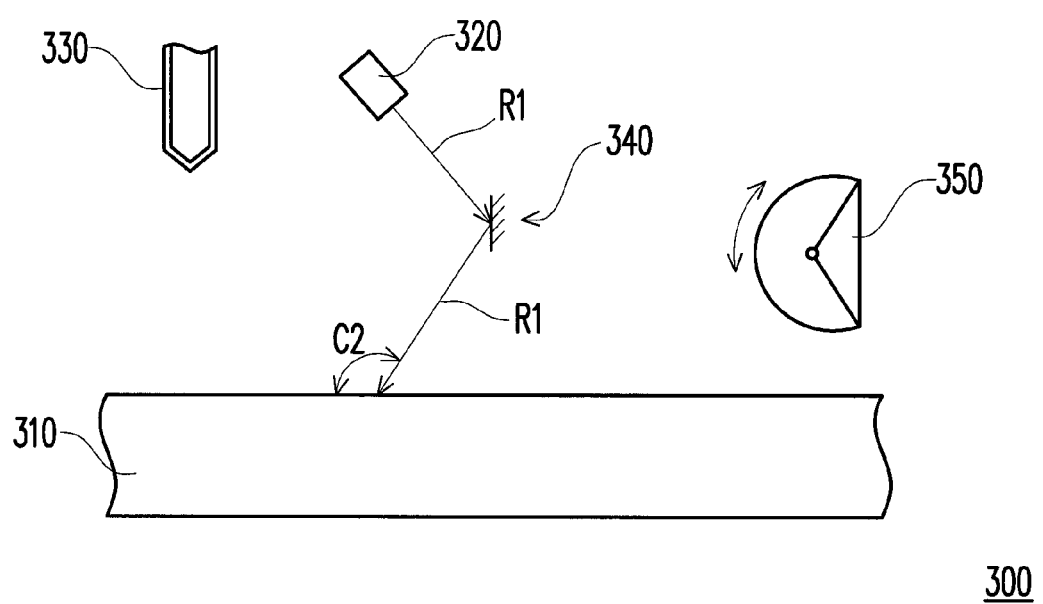
FIG. 3 is a partial schematic view of a cutting apparatus according to an embodiment of the invention.

FIG. 3 is a partial schematic view of a cutting apparatus according to an embodiment of the invention. Referring to FIG. 2 and FIG. 3, in the embodiment, a cutting apparatus 300 includes a platform 310, a laser unit 320, and a reflector 340, wherein the laser unit 320, and the reflector 340 are correspondingly disposed on the platform 310. The reflector 340 is disposed at an adjustable angle corresponding to the platform 310 and the laser unit 320. When the laser unit 320 emits a laser beam R1, the laser beam R1 is reflected by the reflector 340, so there is a second obtuse angle C2 between the laser beam R1 and the platform 310. In addition, the sum of the second obtuse angle C2 and the first acute angle N1 is 180 degrees. In other words, the first acute angle N1 between the side wall A2 and the surface S1 of the electronic paper unit 200 of FIG. 2 can be cut by the laser beam R1 having the second obtuse angle C2 with the platform 310.

Similarly, in another embodiment of the invention, the user can also adjust the angle of the reflector 340 so there is a second acute angle between the laser beam and the platform 310, corresponding to the obtuse angle M1 between the side wall A1 and the surface S1 of the electronic paper unit 100 after cutting shown in FIG. 1, so the sum of the first obtuse angle M1 and the second acute angle is also 180 degrees. It should be explained that there are several ways to control the angle of the laser beam relative to the platform, and the reflector 340 described above is just one of them. For example but limited to, a sample with its surface that a laser beam is orthogonal thereto could be cut into an inclined side wall because of the Gaussian distribution of the laser beam. A user could choose a suitable way to adjust the angle of the laser beam relative to the platform.

In addition, the cutting apparatus 300 further comprises a vacuum roller 350, capable of being raised, lowered, and rotated as disposed corresponding to the platform 310. After the electronic paper unit 100 or 200 is cut by the laser unit 320, the vacuum roller 350 is used to get the electronic paper unit 100 or 200 from the platform 310.

In another embodiment of the invention, the laser unit 320 could be replaced by a blade unit. The blade unit is suited for cutting an object with higher flexibility, and the electronic paper unit 100 or 200 could be cut along a determined direction by the blade unit that the blade unit is orthogonal to the platform 310 or with an inclination to the platform 310, such that the electronic paper unit 100 or 200 is formed with inclined side wall.

Figure 4A:
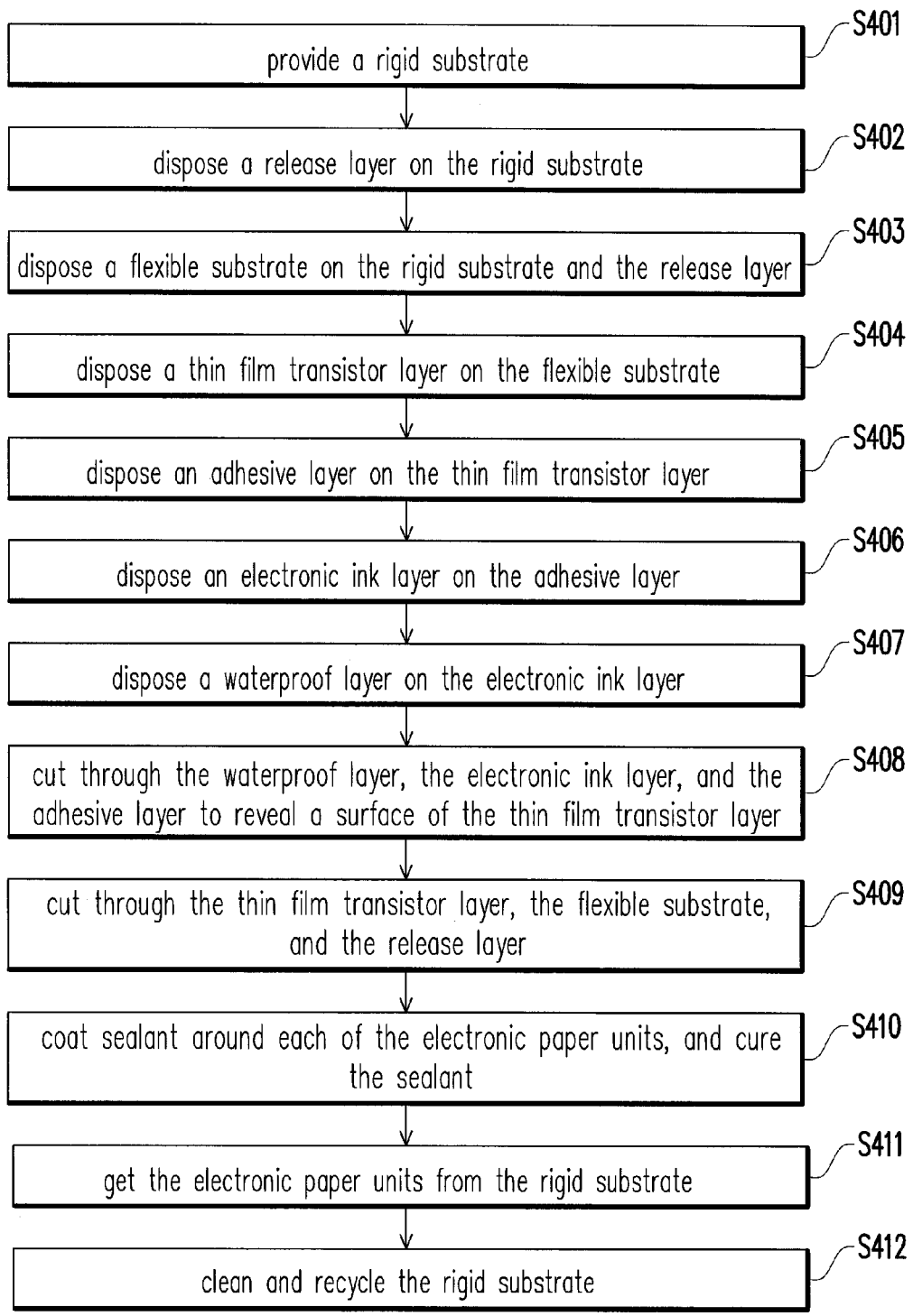
FIG. 4A is a flowchart of a method of fabricating electronic paper units according to an embodiment of the invention.
Figure 5A:
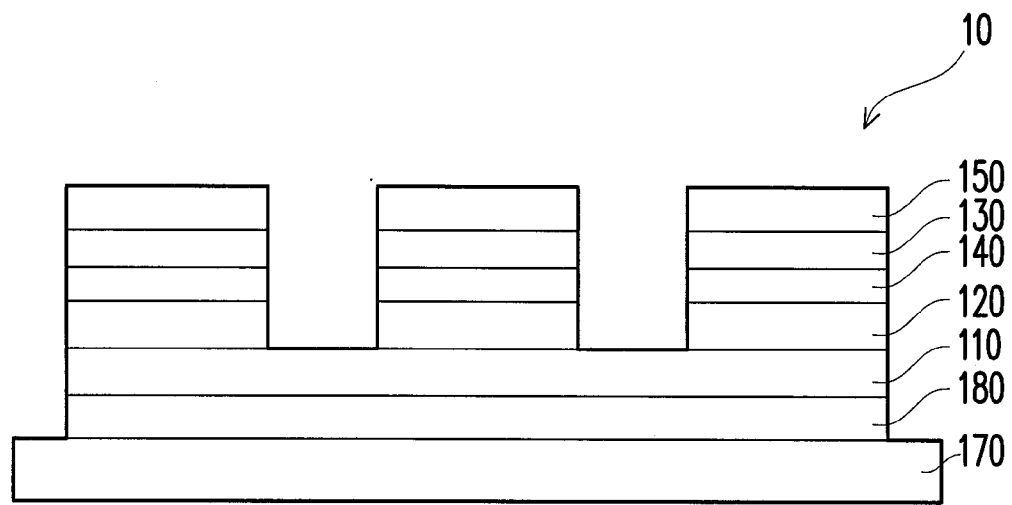
FIG. 5A to FIG. 5C is a schematic view of an electronic paper unit of the fabrication method of FIG. 4A.
Figure 5B:
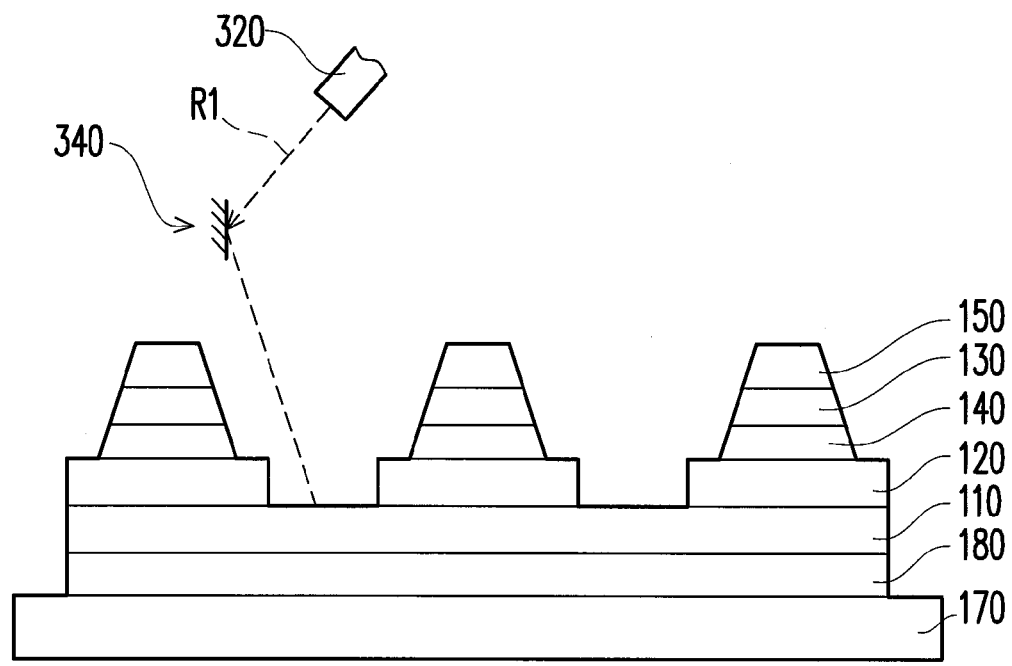
Figure 5C:
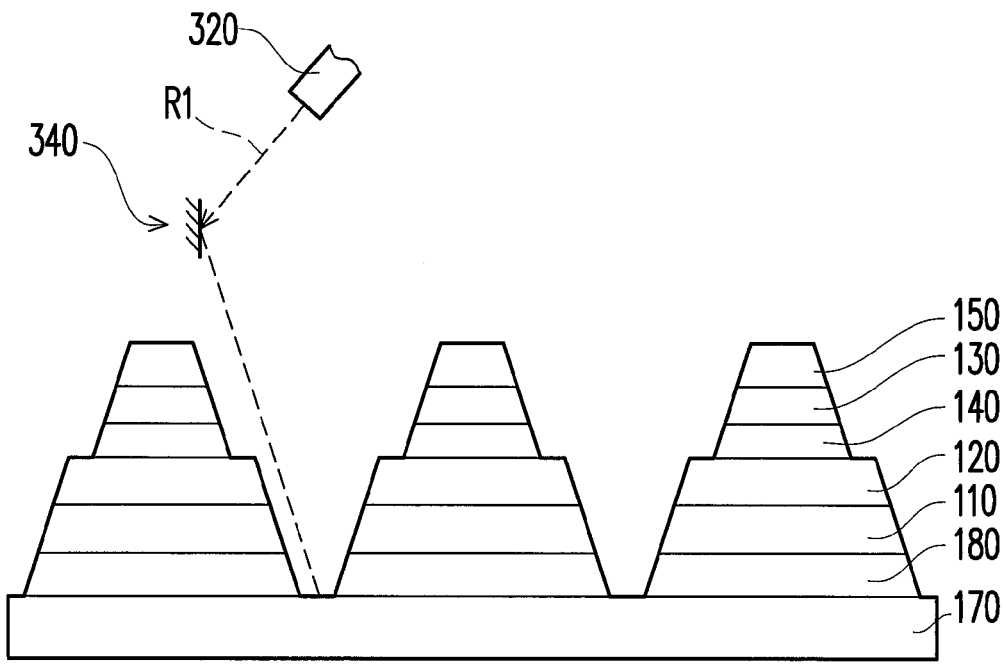

FIG. 4A is a flowchart of a method of fabricating electronic paper units according to an embodiment of the invention. FIG. 5A to FIG. 5C depict a schematic view of an electronic paper unit during the fabrication method of FIG. 4A. Referring to both FIG. 4A and FIG. 5A through FIG. 5C, the embodiment is described with the embodiment of FIG. 1 as the fabrication target. Firstly, in step S401, a rigid substrate 170 is provided, such as a glass substrate. Next, in step S402, a release layer 180 can be disposed on the rigid substrate 170, wherein the release layer 180 could be coated, pasted or with other suitable ways on the rigid substrate 170. In the steps S403-S407, a flexible substrate 110, a thin film transistor layer 120, an adhesive layer 140, an electronic ink layer 130, and a waterproof layer 150 can be sequentially disposed on the rigid substrate 170 and the release layer 180, so the above layers form an electronic paper array 10 (depicted in FIG. 5A). For enhancing the convenience during the fabrication method, the release layer 180 and the flexible substrate 110 could be a continuous film structure individually, and the thin film transistor layer 120, the adhesive layer 140, the electronic ink layer 130, and the waterproof layer 150 could be a discontinuous film structure individually.

Next, the electronic paper array 10 is cut into a plurality of electronic paper units 100 by the cutting apparatus depicted in FIG. 3. The following description takes the laser unit 320 and the electronic paper unit 100 depicted in FIG. 1 for example. Referring to FIG. 4A and FIG. 5B, in step S408, cutting through the waterproof layer 150, the electronic ink layer 130 and the adhesive layer 140 to reveal the surface S1 of the thin film transistor layer 120 (depicted in FIG. 1). In detail, an edge surface of the waterproof layer 150 and an edge surface of the electronic ink layer 130 form a side wall A1 by cutting through the waterproof layer 150 and the electronic ink layer 130, wherein an obtuse angle M1 exists between the side wall A1 and the surface S1 of the thin film transistor layer 120. Next, referring to step S409 and FIG. 5C, cutting through the thin film transistor layer 120, the flexible substrate 110, and the release layer 180. In step S410, coating and curing sealant 160 around each electronic paper units 100 then. In step S411, getting the electronic paper units from the rigid substrate 170 by the vacuum roller 350 depicted in FIG. 3. Finally, in step S412, cleaning and recycling the rigid substrate 170 such that the rigid substrate 170 could be used in next fabrication method again. The electronic paper units 200 in FIG. 2 are also be made of the same fabrication method described above.

It should be explained that the release layer 180 is attached on the rigid substrate 170 and is not peeled from the rigid substrate 170 with the electronic paper unit 100 in this embodiment, but the invention is not limited thereto. In other embodiment, the release layer 180 could be removed with the electronic paper unit 100 when being peeled from the rigid substrate 170, wherein the function of the electronic paper unit 100 is not affected by the release layer 180.

Figure 4B:
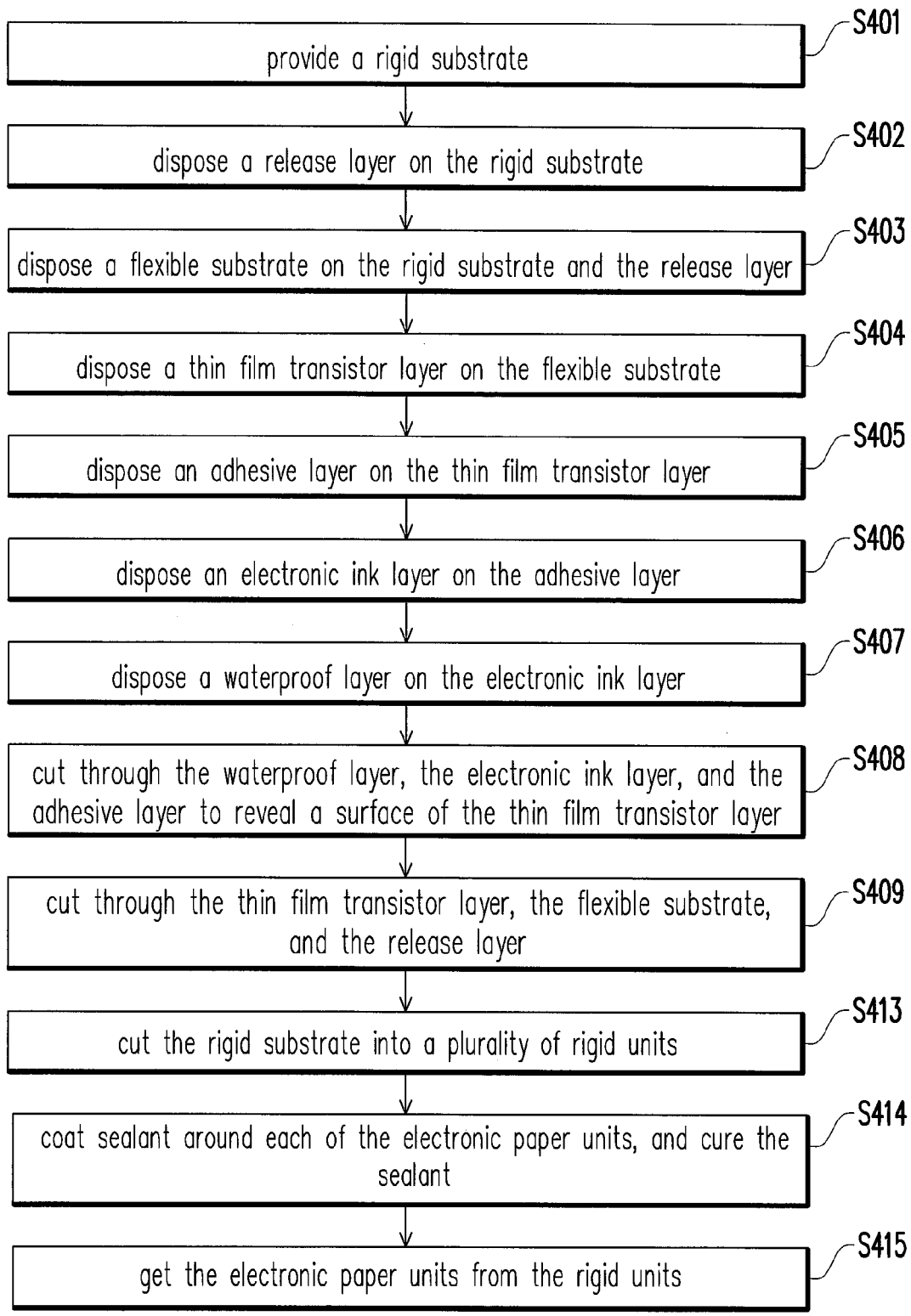
FIG. 4B is a flowchart of a method of fabricating electronic paper units according to another embodiment of the invention.
Figure 5D:
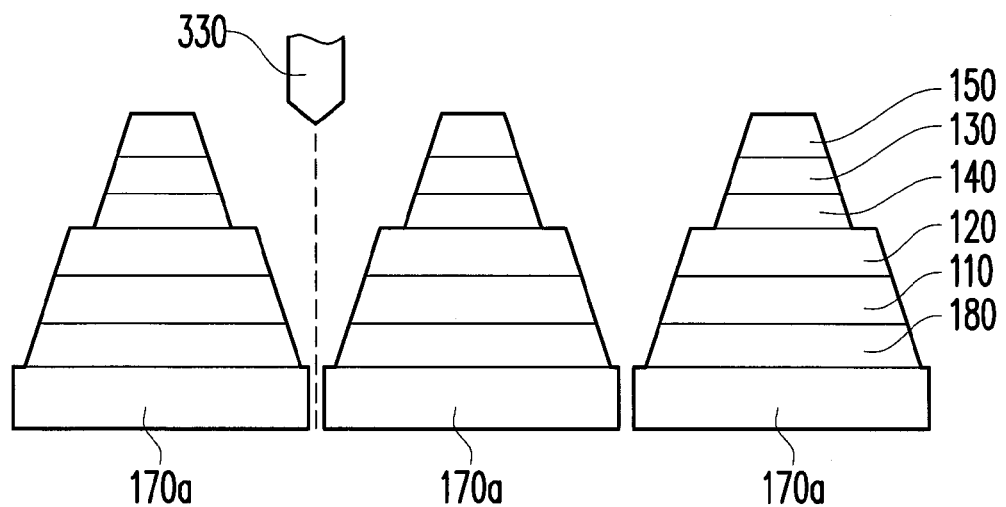
FIG. 5D is a schematic view of an electronic paper unit of one step of the fabrication method of FIG. 4B.

The laser unit 320 can cut layers of the electronic paper unit 100. Besides, the laser unit 320 has a heat treatment toward the cut layers such that enhancing the connection between layers. The method of cutting the electronic paper unit by the blade unit don't have the effect of enhancing the connection between layers of the electronic paper unit 100. FIG. 4B is a flowchart of a method of fabricating electronic paper units according to another embodiment of the invention. FIG. 5D is a schematic view of an electronic paper unit corresponding to one step of FIG. 4B. Referring to FIG. 4B and FIG. 5A through FIG. 5D, the difference between this embodiments and described above is the cutting apparatus 300 further comprises a knife cutter 330 (depicted in FIG. 3). The knife cutter 330 can be a wheel cutter used for cutting the rigid substrate 170. The wheel cutter is suitable for cutting harder material. The wheel cutter is a cutter can move along a determined direction and rotate according to the center of wheel cutter during cutting. After the step S409 is done, in step S413, cutting the rigid substrate 170 into a plurality of rigid units 170a, and then coating and curing sealant 160 around each electronic paper units 100 in step S414. In step S415, getting the electronic paper unit 100 from each rigid units. The fabricating method in this embodiment is used for the limitation of the apparatus or the process that the rigid substrate 170 could not be recycled, but the result is the same as the electronic paper units described in above embodiments.

Generally, in the embodiment of the invention, the electronic paper unit is cut to form a side wall that has an acute angle or an obtuse angle, and when coating sealant, air bubbles are effectively reduced and the electronic layer will be effectively prevented from moisture.

Furthermore, the cutting apparatus comprises the laser unit or the blade unit. The laser unit can also have heat treatment between layers of the electronic paper unit when cutting. It will increase the adhesiveness between layers of the electronic paper unit.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic paper unit, comprising:
a flexible substrate;
a thin film transistor layer, disposed on the flexible substrate;
an electronic ink layer, disposed on a surface of the thin film transistor layer;
a waterproof layer, disposed on the electronic ink layer, wherein an edge surface of the waterproof layer and an edge surface of the electronic ink layer form a side wall, and there is a first acute angle or a first obtuse angle between the side wall and the surface of the thin film transistor layer; and
a sealant, coated and covered on the side wall and the surface of the thin film transistor layer.

2. The electronic paper unit as claimed in claim 1, wherein an orthogonal projection area of a top of the waterproof layer on the surface of the thin film transistor layer, is less than an orthogonal projection area of a base of the electronic ink layer on the surface of the thin film transistor layer.

3. The electronic paper unit as claimed in claim 1, wherein an orthogonal projection area of a top of the waterproof layer on the surface of the thin film transistor layer, is greater than an orthogonal projection area of a base of the electronic ink layer on the surface of the thin film transistor layer.

4. The electronic paper unit as claimed in claim 1, further comprising an adhesive layer, disposed between the thin film transistor layer and the electronic ink layer.

5. The electronic paper unit as claimed in claim 1, wherein the first acute angle is greater than 80 degrees and less than 90 degrees.

6. The electronic paper unit as claimed in claim 1, wherein the first obtuse angle is greater than 90 degrees and less than 100 degrees.

7. A fabricating method of electronic paper units, comprising:
providing a rigid substrate;
sequentially disposing a flexible substrate, a thin film transistor layer, an electronic ink layer, and a waterproof layer on the rigid substrate, to form an electronic paper array;
cutting the electronic paper array into a plurality of electronic paper units;
coating and curing sealant around each of the electronic paper units; and
removing the electronic paper units from the rigid substrate.

8. The fabricating method of electronic paper units as claimed in claim 7, wherein the steps of cutting the electronic paper array into a plurality of electronic paper units includes:
cutting through the waterproof layer and the electronic ink layer to reveal a surface of the thin film transistor layer; and
cutting through the thin film transistor layer and the flexible substrate.

9. The fabricating method of electronic paper units as claimed in claim 8, wherein the steps of cutting through the waterproof layer and the electronic ink layer to reveal the surface of the thin film transistor layer includes:
cutting through the electronic ink layer and the waterproof layer that an edge surface of the waterproof layer and an edge surface of the electronic ink layer form a side wall where there is a first acute angle or a first obtuse angle between the side wall and the surface of the thin film transistor layer.

10. The fabricating method of electronic paper units as claimed in claim 8, further comprising:
disposing a release layer between the rigid substrate and the flexible substrate.

11. The fabricating method of electronic paper units as claimed in claim 10, wherein the steps of cutting through the thin film transistor layer and the flexible substrate includes:
cutting through the release layer.

12. The fabricating method of electronic paper units as claimed in claim 8, further comprising:
disposing an adhesive layer between the thin film transistor layer and the electronic ink layer.

13. The fabricating method of electronic paper units as claimed in claim 12, wherein the steps of cutting through the waterproof layer and the electronic ink layer to reveal the surface of the thin film transistor layer includes:
cutting through the adhesive layer to reveal the surface of the thin film transistor layer.

14. The fabricating method of electronic paper units as claimed in claim 7, wherein the steps of cutting the electronic paper array into a plurality of electronic paper units further includes:

cutting the rigid substrate into a plurality of rigid units.

15. The fabricating method of electronic paper units as claimed in claim 7, wherein the waterproof layer, the electronic ink layer, the thin film transistor layer, and the flexible substrate are cut by a laser unit such that a heat treatment is treated on cutting surfaces of the waterproof layer, the electronic ink layer, the thin film transistor layer, and the flexible substrate.

16. The fabricating method of electronic paper units as claimed in claim 7, further comprising:

cleaning and recycling the rigid substrate.

* * * * *